US012807024B2

(12) United States Patent

Fukuoka et al.

(10) Patent No.: US 12,807,024 B2

(45) Date of Patent: Nov. 24, 2026

(54) MANAGEMENT DEVICE AND MANAGEMENT SYSTEM FOR MANAGING ELECTRIC POWER SUPPLY-AND-DEMAND PLAN DURING ABNORMALITY

(71) Applicant: TOYOTA JIDOSHA KABUSHIKI KAISHA, Toyota (JP)

(72) Inventors: Keisuke Fukuoka, Fujieda (JP); Tomoya Takahashi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 18/492,943

(22) Filed: Oct. 24, 2023

(65) Prior Publication Data

US 2024/0262235 A1 Aug. 8, 2024

(30) Foreign Application Priority Data

Feb. 8, 2023 (JP) ................................ 2023-017564

(51) Int. Cl.

*B60L 53/67* (2019.01)
*B60L 53/62* (2019.01)
*B60L 53/63* (2019.01)
*B60L 55/00* (2019.01)
*B60L 53/68* (2019.01)

(52) U.S. Cl.

CPC ............... *B60L 53/63* (2019.02); *B60L 53/62* (2019.02); *B60L 53/67* (2019.02); *B60L 53/68* (2019.02); *B60L 55/00* (2019.02)

(58) Field of Classification Search

CPC .......... B60L 53/63; B60L 53/62; B60L 53/67; B60L 53/68; B60L 55/00; B60L 2240/70; B60L 2240/80; B60L 3/00; B60L 2260/50; B60L 53/00; B60L 58/10; H02J 3/322; H02J 3/466; H02J 2103/35

See application file for complete search history.

(56) References Cited

U.S. PATENT DOCUMENTS

| | | | | |
|---|---|---|---|---|
| 2019/0207268 | A1* | 7/2019 | Lai | H02J 7/751 |
| 2020/0114775 | A1* | 4/2020 | Tsurutani | B60L 3/12 |
| 2022/0194256 | A1 | 6/2022 | Nakamura | |
| 2022/0289065 | A1* | 9/2022 | Matsuda | B60L 53/14 |

FOREIGN PATENT DOCUMENTS

| | | | | | |
|---|---|---|---|---|---|
| JP | 2022-098779 | A | | 7/2022 | |
| KR | 20200075055 | A | * | 6/2020 | B60L 53/62 |
| KR | 20210046479 | A | * | 4/2021 | B60L 53/60 |

OTHER PUBLICATIONS

Lee Dong Jun, English translation of KR-20200075055-A, Published 2020 (Year: 2020).*

Park Ki Jun, English translation of KR-20210046479-A, Published 2021 (Year: 2021).*

* cited by examiner

*Primary Examiner* — Jonathan Michael Skrzycki

(74) *Attorney, Agent, or Firm* — SoraIP, Inc.

(57) ABSTRACT

When an abnormality that disables charging and discharging is detected, the processor estimates a predicted recovery time until recovery from the abnormality, in accordance with a type of the abnormality. The processor sets the charging and discharging vehicle equipped with the battery that was connected to the EVSE when the abnormality was detected as a vehicle to be used for the electric power supply-and-demand plan after the EVSE's predicted recovery time has elapsed.

3 Claims, 5 Drawing Sheets

MANAGEMENT DEVICE AND MANAGEMENT SYSTEM FOR MANAGING ELECTRIC POWER SUPPLY-AND-DEMAND PLAN DURING ABNORMALITY

CROSS-REFERENCE TO RELATED APPLICATION

This application claims priority to Japanese Patent Application No. 2023-017564 filed on Feb. 8, 2023, incorporated herein by reference in its entirety.

BACKGROUND

1. Technical Field

The present disclosure relates to a management device and a management system.

2. Description of Related Art

Virtual power plants (VPP), in which a plurality of distributed energy resources (DER) are integrated and controlled as if they were a single power plant, are attracting attention as a way to maintain supply and demand balance of electric power supplied from an electric power system. For example, a power storage device provided in a vehicle is electrically connected to an electric power system via charging and discharging equipment, and incorporated into an electric power supply-and-demand plan for the electric power system as one of the distributed energy resources.

Japanese Unexamined Patent Application Publication No. 2022-098779 (JP 2022-098779 A) discloses a vehicle diagnostic method for determining whether charging of a power storage device in an object vehicle will be started when the power storage device provided in the object vehicle enters a chargeable state in which electric power fed from charging and discharging equipment can be received.

SUMMARY

In the vehicle diagnosis method disclosed in JP 2022-098779 A, when an abnormality that disables charging and discharging is detected, an electric power regulation resource such as the power storage device is excluded from resources used for the electric power supply-and-demand plan. However, depending on the type of abnormality, this electric power regulation resource may be able to recover from the abnormality at an early stage in some cases. Even in such a case, when this electric power regulation resource is excluded from the electric power supply-and-demand plan, an electric power supply and demand amount that is planned for the electric power system may be insufficient.

An object of the present disclosure is to provide a management device and a management system that can suppress shortage from occurring in the electric power supply and demand amount that was planned for an electric power system.

A management device according to the present disclosure is a device that manages an electric power supply-and-demand plan for a plurality of electric power regulation resources, each of which is electrically connectable to an electric power system via charging and discharging equipment. The management device includes a processor and memory that stores a program executable by the processor. When an abnormality that disables charging and discharging is detected, the processor estimates a predicted recovery time until recovery from the abnormality, in accordance with a type of the abnormality. The processor sets an object vehicle, in which is installed an electric power regulation resource that was connected to the charging and discharging equipment when the abnormality was detected, as a vehicle to be used for an electric power supply-and-demand plan after the predicted recovery time elapses at the charging and discharging equipment.

According to this configuration, even if an abnormality that disables charging and discharging is detected, the vehicle in which is installed the electric power regulation resource that was connected to the charging and discharging equipment when the abnormality was detected is incorporated into the electric power supply-and-demand plan, based on the predicted recovery time till recovery from the abnormality. Thus, the electric power supply-and-demand plan is formulated in anticipation of recovery time from the abnormality, and accordingly a situation in which a shortage occurs in the electric power supply and demand amount that is planned for the electric power system can be suppressed.

Preferably, the abnormality may have occurred in the object vehicle. Thus, the electric power supply-and-demand plan is formulated including the vehicle in which the abnormality has occurred, and accordingly a situation in which a shortage occurs in the electric power supply and demand amount that is planned for the electric power system can be suppressed.

Preferably, when the abnormality is detected, the processor may select a vehicle to be connected to the charging and discharging equipment instead of the object vehicle, from among a candidate vehicle group used in the electric power supply-and-demand plan at the charging and discharging equipment. The processor may add the object vehicle to the candidate vehicle group. Thus, the vehicle that will be connected to the charging and discharging equipment next is selected from the candidate vehicle group, with the vehicle in which an abnormality is detected being added to the candidate vehicle group, and accordingly the candidate vehicle group can be generated taking into consideration the recovery time from the abnormality.

Preferably, an order of connection to the charging and discharging equipment may be set for each vehicle in the candidate vehicle group. When adding the object vehicle to the candidate vehicle group, the processor may determine the order of connecting the object vehicle to the charging and discharging equipment based on the predicted recovery time. Thus, in the candidate vehicle group, the order of connection to the charging and discharging equipment of the vehicle in which an abnormality has been detected is determined based on the predicted recovery time, and accordingly charging and discharging with respect to the electric power system can be performed such that occurrence of wasteful standby time is minimized.

A management system of the present disclosure includes charging and discharging equipment, a plurality of electric power regulation resources, each of which is electrically connectable to an electric power system via the charging and discharging equipment, and a management device that manages an electric power supply-and-demand plan for the power regulation resources. When an abnormality that disables charging and discharging is detected, the management device estimates a predicted recovery time until recovery from the abnormality, in accordance with a type of the abnormality. The management device sets an object vehicle, in which is installed an electric power regulation resource that was connected to the charging and discharging equipment when the abnormality was detected, as a vehicle to be used for an electric power supply-and-demand plan after the predicted recovery time elapses at the charging and discharging equipment.

According to this configuration, even if an abnormality that disables charging and discharging is detected, the vehicle in which is installed the electric power regulation resource that was connected to the charging and discharging equipment when the abnormality was detected is incorporated into the electric power supply-and-demand plan, based on the predicted recovery time till recovery from the abnormality. Thus, the electric power supply-and-demand plan is formulated in anticipation of recovery time from the abnormality, and accordingly a situation in which a shortage occurs in the electric power supply and demand amount that is planned for the electric power system can be suppressed.

According to the present disclosure, a situation in which a shortage occurs in an electric power supply and demand amount that is planned for an electric power system can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
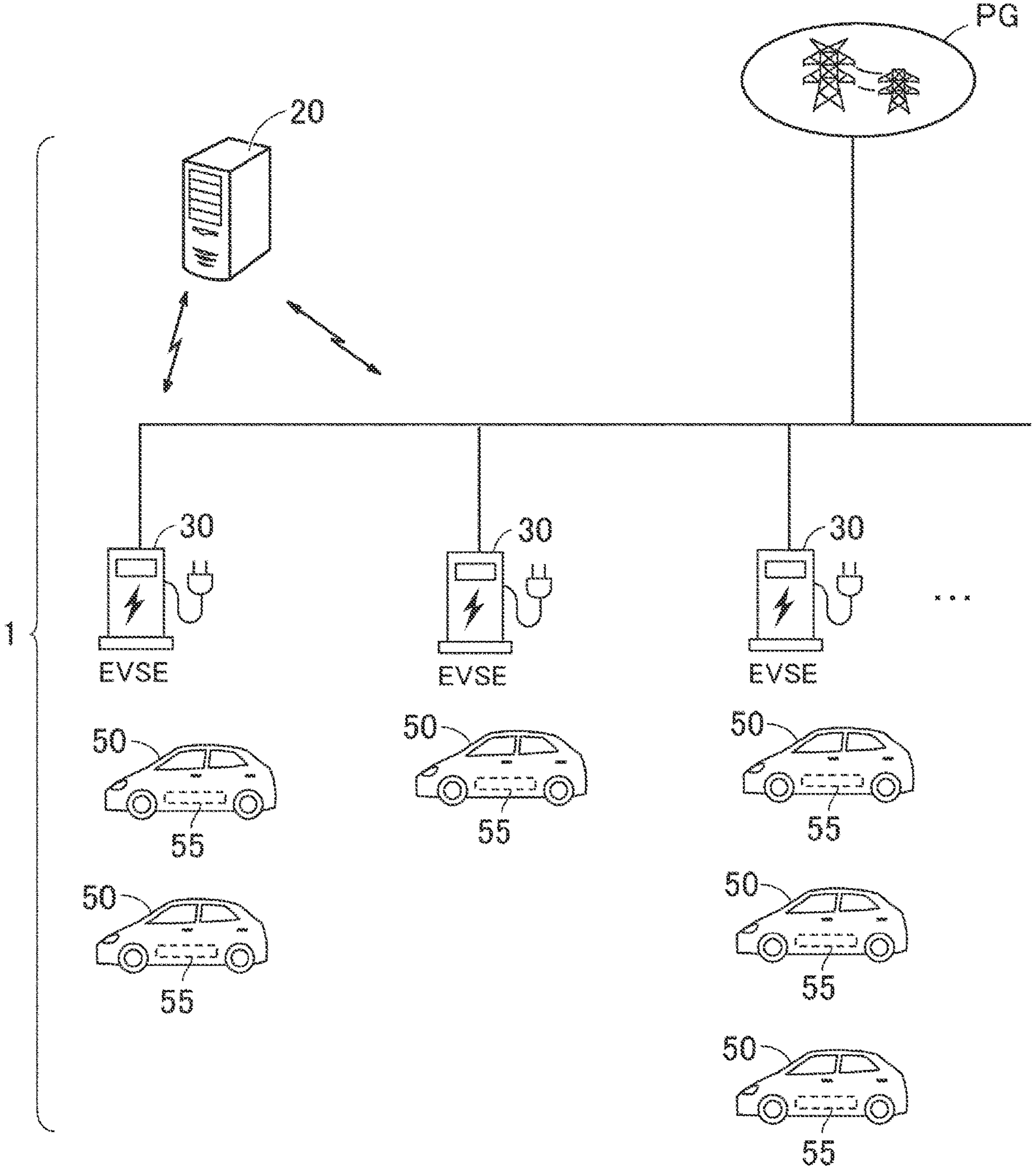
FIG. 1 is a schematic overall configuration diagram of a management system provided with a management device according to this embodiment.

Hereinafter, embodiments of the present disclosure will be described in detail with reference to the drawings. The same or corresponding parts in the drawings are denoted by the same reference numerals, and the description thereof will not be repeated.

FIG. 1 is a schematic overall configuration diagram of a management system 1 including a management device 20 according to this embodiment. As shown in FIG. 1, the management system 1 includes a management device 20, a plurality of Electric Vehicle Service Equipment (EVSE) 30, and a plurality of batteries 55 mounted in a plurality of vehicles 50, respectively.

The management system 1 is configured as part of a virtual power plant (VPP) system. The VPP system bundles multiple DERs (Distributed Energy Resources) with advanced energy management technology that utilizes the Internet of Things (IoT), and is a mechanism that functions like one power plant by remotely integrating and controlling these DERs.

The VPP system includes an electric power system PG and a management system 1. The electric power system PG is an electric power system including power plants, transmission lines, high-voltage substations, etc., and is a power network managed by power companies (power generators, power transmission/distribution companies, retail power companies, etc.).

Each of the plurality of batteries 55 can be electrically connected to the electric power system PG via the EVSE 30 and can be charged and discharged with the electric power system PG. The battery 55 is a DER and corresponds to an example of an "electric power regulation resource" of the present disclosure. The EVSE 30 corresponds to an example of the "charging and discharging equipment" of the present disclosure.

The management device 20 manages an electric power supply-and-demand plan (charging and discharging plan) of a plurality of batteries 55 (DER) that can be charged and discharged with the electric power system PG. The management device 20 is a server (aggregation server) managed and operated by an aggregator, and directly concludes a VPP service contract with a consumer (for example, a vehicle user) who owns DER, and controls DER. An aggregator is an electric power company that provides an energy management service by bundling a plurality of DERs in a region or predetermined facilities. The management device 20 creates a power supply-and-demand plan for a plurality of batteries 55 (DER) based on a Demand Response (DR) request from the power company.

Vehicle 50 is configured to be able to run using electric power stored in battery 55. Vehicle 50 in the present embodiment is a Battery Electric Vehicle (BEV) without an engine (internal combustion engine), but may be a Plug-in Hybrid Electric Vehicle (PHEV). Battery 55 is composed of, for example, a secondary battery such as a lithium-ion battery or a nickel-metal hydride battery.

The EVSE 30 is a power supply device compatible with Vehicle to Grid (V2G) (or Vehicle to Home (V2H)), and charges the battery 55 with power supplied from the electric power system PG or supplies power discharged from the battery 55 to the electric power system PG.

Figure 2:
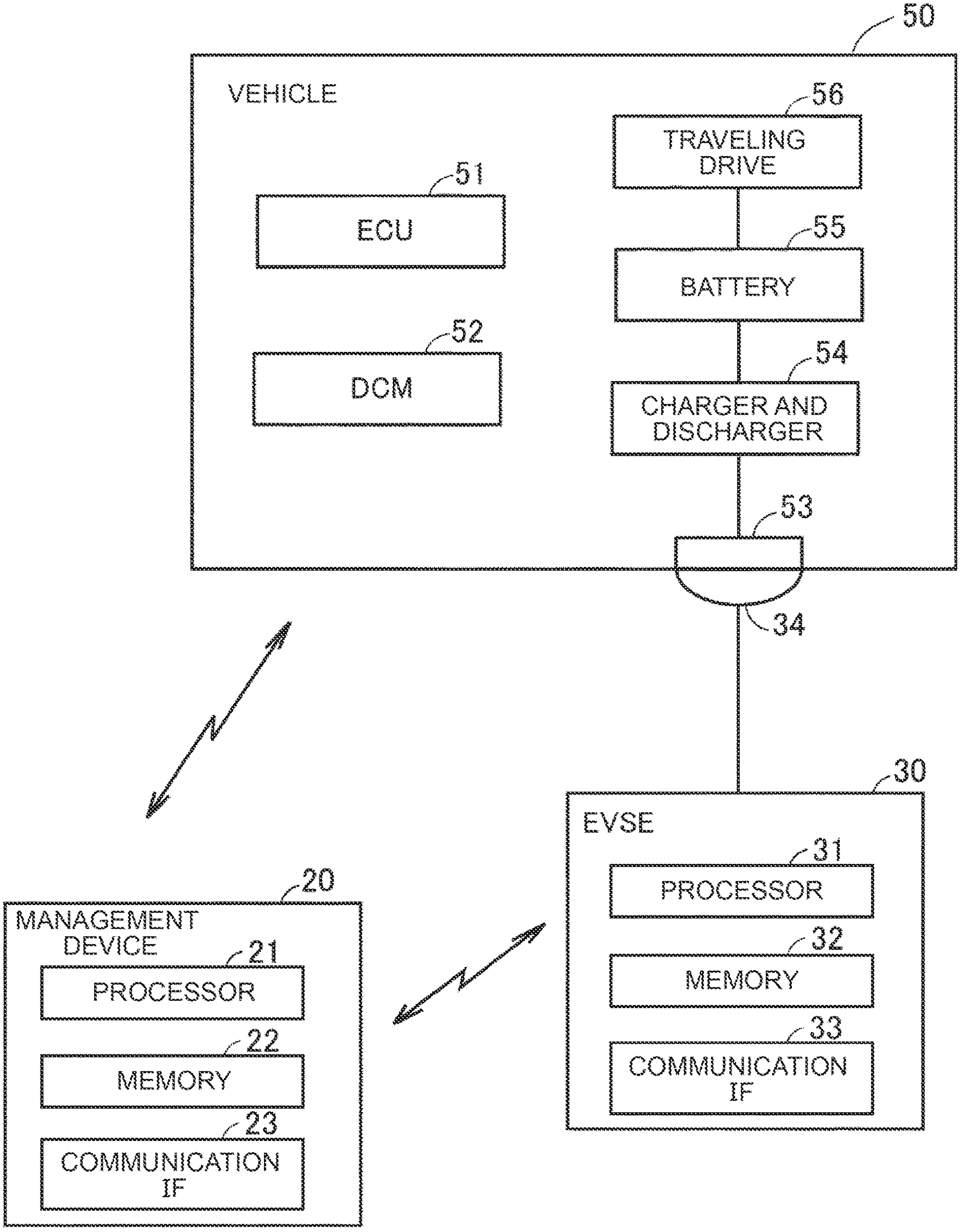
FIG. 2 is a schematic diagram showing the configuration of each device such as a management device in this embodiment.

FIG. 2 is a schematic diagram showing the configuration of each device such as the management device 20 according to the present embodiment. The management device 20 has a processor 21, a memory 22 and a communication interface (IF) 23. Processor 21 executes programs stored in memory 22. Management device 20 communicates with vehicle 50 and EVSE 30 via communication IF 23 to exchange various data.

The vehicle 50 includes an ECU 51, a DCM 52, a charging and discharging port 53, a charger and discharger 54, a battery 55, and a travel drive section 56.

The ECU 51 has hardware such as a processor and memory. The ECU 51 detects the state of the battery 55 (for example, State Of Charge (SOC)) and controls charging and discharging of the battery 55. DCM 52 communicates with management device 20, EVSE 30, and the like.

Travel drive unit 56 includes a power control unit (PCU) and a motor generator (MG), and is configured to run vehicle 50 using electric power stored in battery 55.

Vehicle 50 can perform charging and discharging of electric power with EVSE 30. Charger and discharger 54 is electrically connected to charging and discharging port 53 and battery 55. The charger and discharger 54 converts the electric power supplied from the EVSE 30 into electric power that can be charged to the battery 55 to charge the battery 55. The charger and discharger 54 converts the electric power discharged from the battery 55 into electric power that can be charged by the EVSE 30 and supplies the power to the EVSE 30.

The EVSE 30 corresponds to charging and discharging equipment outside the vehicle 50. The EVSE 30 comprises a charging and discharging cable with a connector 34 at its distal end. By connecting (plugging in) the connector 34 to the charging and discharging port 53 of the vehicle 50, charging and discharging between the vehicle 50 and the EVSE 30 becomes possible.

EVSE 30 comprises processor 31, memory 32 and communication IF 33. Processor 31 executes programs stored in memory 32. EVSE 30 communicates with management device 20 and vehicle 50 via communication IF 33 to exchange various data.

The DR request sent to the management device 20 is the time period (date and time) in which the DR is to be executed and the requested charging and discharging electric power, and for example, 30 minutes is one frame, and the charging and discharging electric power in each frame. The management device 20 creates an electric power supply-and-demand plan (charge and discharge plan) for each DER (battery 55) based on the DR request.

A user who owns a vehicle 50 that has made a contract with an aggregator can receive a predetermined incentive by charging and discharging according to a request from the aggregator. In addition, users who do not comply with the request, even though they have approved to comply with the request, are subject to prescribed penalties (penalties) or cannot receive incentives according to the above contract.

Figure 3:
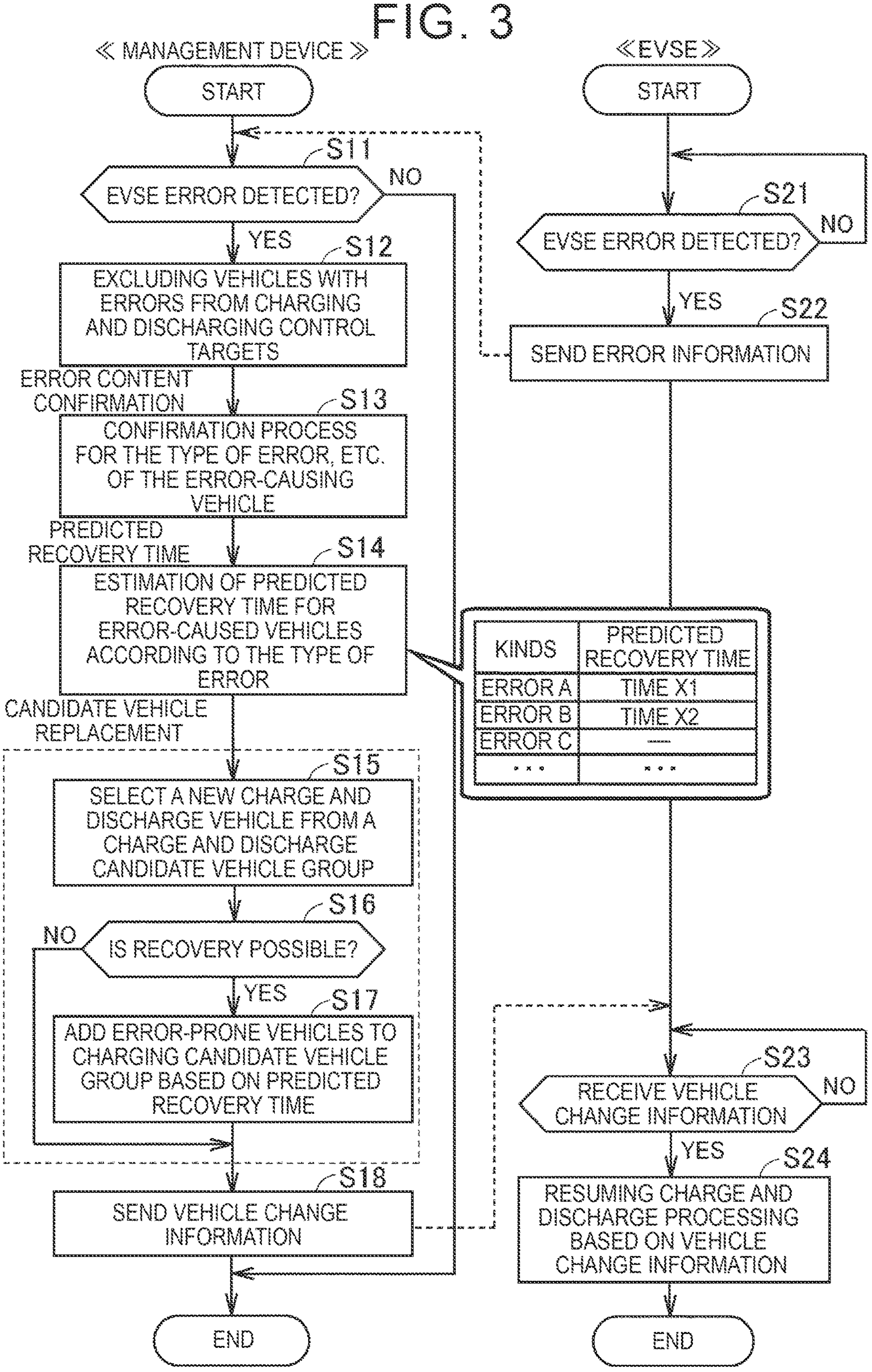
FIG. 3 is a flowchart showing an example of processing executed by the management device and EVSE.

FIG. 3 is a flowchart showing an example of processing executed by the management device 20 and the EVSE 30. The process executed on the management device 20 side is executed periodically (for example, every 100 msec). Processing executed on the EVSE 30 side is executed when connection with the vehicle 50 is detected.

The management device 20 creates a power supply-and-demand plan in response to a DR request from an electric power company (retail electric power company, etc.), and issues commands to a plurality of EVSEs 30 connected under its control. The management device 20 manages a group of vehicles scheduled to be charged and discharged in each EVSE 30 as a charging and discharging candidate vehicle group based on the electric power supply-and-demand plan. The charging and discharging candidate vehicle group corresponds to an example of the "candidate vehicle group" of the present disclosure.

When the processing on the EVSE 30 side starts, the EVSE 30 determines in S21 whether an EVSE error has been detected. Hereinafter, an "EVSE error" refers to an abnormality (error) that disables charge and discharge between the electric power system PG and the battery 55 via the EVSE 30. In this embodiment, an EVSE error is an error that occurs in vehicle 50. EVSE errors are detected at EVSE 30.

When the EVSE 30 determines that an EVSE error has been detected (YES in S21), the EVSE 30 transmits error information to the management device 20 (S22), and proceeds to S23. On the other hand, if the EVSE 30 does not determine that an EVSE error has been detected (NO in S21), the process returns to S21. As a result, the processing of S21 is repeated until an EVSE error is detected. Note that the EVSE 30 may terminate this process when the connection with the vehicle 50 is terminated.

Figure 4:
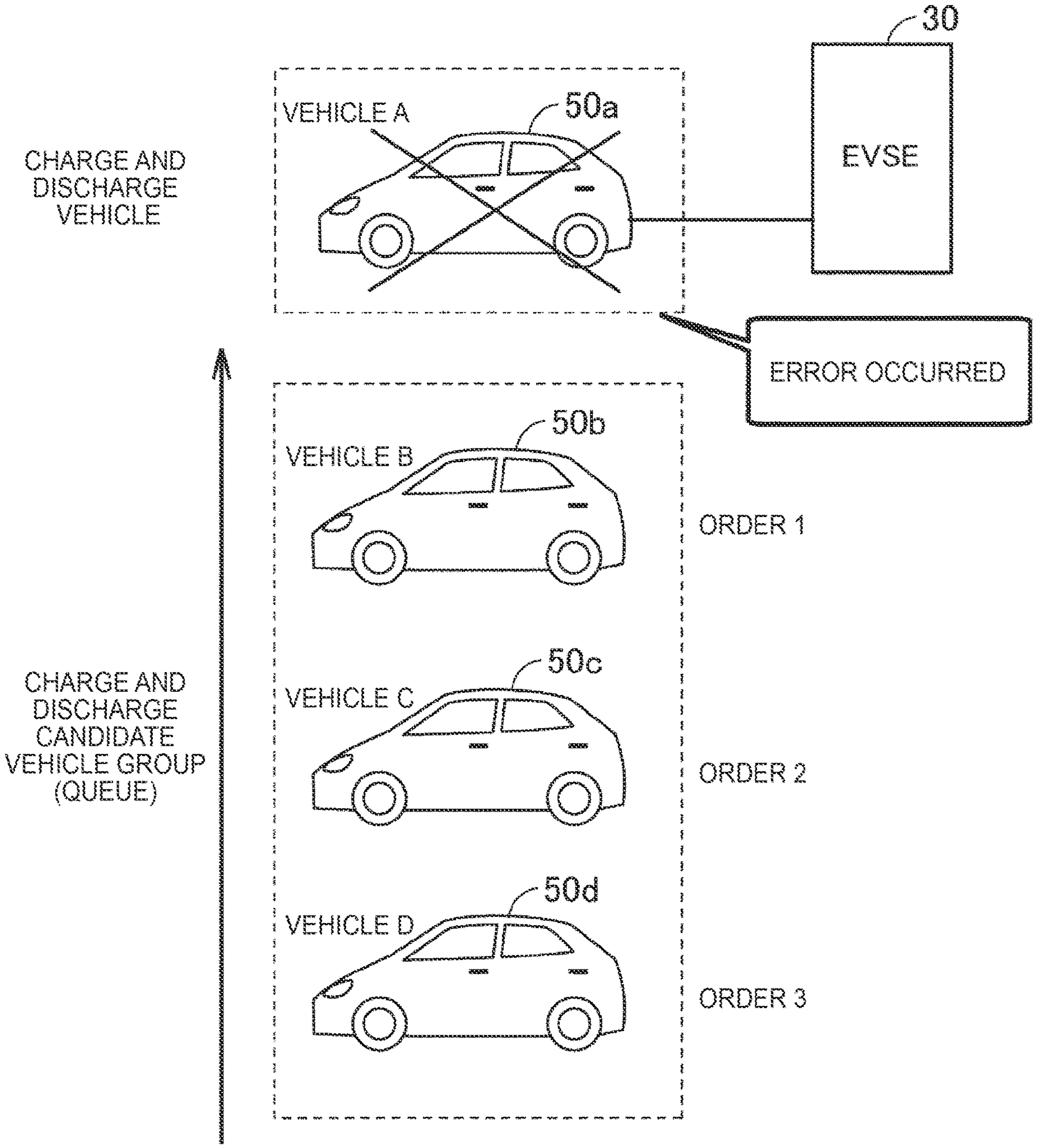
FIG. 4 is a diagram showing an example of a charging and discharging vehicle and a charging and discharging candidate vehicle group when an error occurs.
Figure 5:
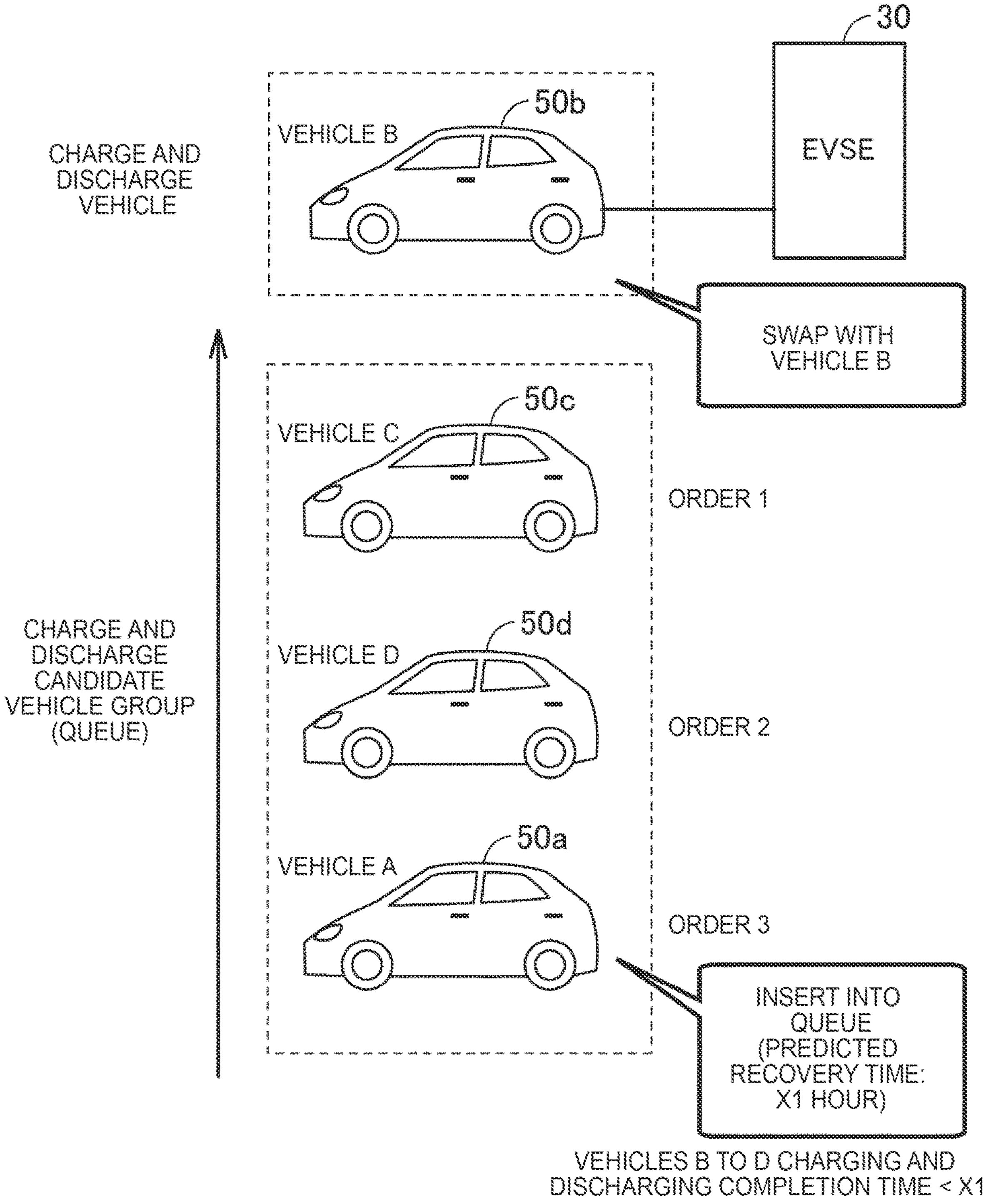
FIG. 5 is a diagram showing an example of a charging and discharging vehicle and a charging and discharging candidate vehicle group when an error occurs.

The situation when an error occurs will be specifically described below. FIGS. 4 and 5 are diagrams showing examples of charging and discharging vehicles and charging and discharging candidate vehicle groups when an error occurs.

As shown in FIG. 4, the EVSE 30 is currently connected to a vehicle 50*a* (also referred to as "vehicle A") for charging and discharging. Here, a vehicle connected to the EVSE 30 for charging and discharging is referred to as a "charging and discharging vehicle". A charging and discharging vehicle corresponds to an example of an "object vehicle" of the present disclosure.

Furthermore, it is assumed that vehicle 50*b* (also referred to as "vehicle B") is scheduled to be charged and discharged after vehicle A (order 1). After vehicle B, vehicle 50*c* (also referred to as "vehicle C") is scheduled to be charged and discharged (order 2). Assume that the vehicle 50*d* (also referred to as "vehicle D") is scheduled to be charged and discharged after the vehicle C (order 3).

The charging and discharging candidate vehicle group refers to the vehicle group (vehicles B, C, and D) forming such a queue. The order of connection to the EVSE 30 is determined for each vehicle in the charge and discharge candidate vehicle group, and charge and discharge are scheduled in order of vehicles B, C, and D (order 1 to 3) after vehicle A.

In the example of FIG. 4, vehicle A, which is a charge and discharge vehicle, is in a chargeable/dischargeable state with EVSE 30. However, an error has occurred in vehicle A. For example, in vehicle A, the temperature of battery 55 becomes high and an error occurs to suppress battery 55 from overheating. In this case, the EVSE 30 transmits error information about the error to the management device 20, such as that an error has occurred in vehicle A and the type of error is "battery overheating" (hereinafter also referred to as "error A") (S22).

Returning to FIG. 3, when the processing on the side of the management device 20 starts, the management device 20 determines whether the EVSE 30 has detected an EVSE error in S11. If the management device 20 determines that an EVSE error has been detected (that is, received error information from the EVSE 30) (YES in S11), the process proceeds to S12. On the other hand, if the management device 20 does not determine that an EVSE error has been detected (NO in S11), the processing on the management device 20 side ends.

In S12, management device 20 excludes vehicle 50 that was connected to EVSE 30 when the EVSE error occurred (hereafter referred to as "error-occurring vehicle") from charging and discharging control targets. As a result, the process of performing charge and discharge between the vehicle in which the error occurred and the EVSE 30 ends.

In S13, the management device 20 executes confirmation processing (error content confirmation) such as the type of error of the vehicle in which the error occurred. In S14, the management device 20 estimates the predicted recovery time of the error-caused vehicle according to the type of error (estimation of predicted recovery time).

For example, if the error type is "error A (battery overheating)", the predicted recovery time is estimated to be "time X1", and if the error type is "error B", the predicted recovery time is estimated to be "time X2", and if the type of error is "error C", the predicted recovery time is estimated to be "-".

In the case of error A (battery overheating), the time X1 until the battery 55 is cooled down to a predetermined temperature at which it can be charged and discharged again is calculated as the predicted recovery time. Error B is also an error that can be resolved over time. The time X2, which is estimated that the error B will be resolved over time, is calculated as the error B predicted recovery time.

Error C is, for example, a hardware failure that has occurred in vehicle 50. For example, if the battery 55 or the like is physically damaged and the error is not resolved even after a period of time has passed, it is determined that recovery is impossible and the predicted recovery time is not calculated (the predicted recovery time is "-").

In the example of FIG. 4 above, vehicle A is excluded from the charge and discharge vehicles. In the confirmation process, information such as that an error has occurred in vehicle A and the type of error is "overheating of battery (error A)" is set. In this case, it is determined that recovery is possible, and "X1" time after which the battery 55 becomes usable again is calculated as the "predicted recovery time."

In this way, when an EVSE error is detected in the EVSE 30, the management device 20 estimates the predicted recovery time until recovery from the error according to the type of error.

Thereafter, in S15 to S17, candidate vehicle replacement processing is executed. In S15, the management device 20 selects a new charge and discharge vehicle from the charge and discharge candidate vehicle group. In this way, when an error is detected, the management device 20 selects a vehicle to be connected to the EVSE 30 instead of the charging and discharging vehicle from among the charging and discharging candidate vehicle group used for the electric power supply-and-demand planning in the EVSE 30.

If the management device 20 determines that recovery is possible (YES in S16), it adds the error-occurring vehicle (charging and discharging vehicle) to the charging and discharging candidate vehicle group based on the predicted recovery time (S17), and proceeds to S18. On the other hand, if the management device 20 determines that recovery is not possible (NO in S16), the management device 20 directly proceeds to S18.

A description will be given below with reference to FIG. 5. Management device 20 selects vehicle B, which is scheduled to be charged and discharged next, from the queue of vehicles B, C, and D, which are charge and discharge candidate vehicle groups, as a new charge and discharge vehicle. As a result, vehicles C and D become the charging and discharging candidate vehicle group.

Vehicle A, which is a charging and discharging vehicle (an error-caused vehicle), is added to the charging and discharging candidate vehicle group because it has been determined that recovery is possible. When adding the charge and discharge vehicle to the charge and discharge candidate vehicle group, the management device 20 determines the order in which the charge and discharge vehicle is connected to the EVSE 30 based on the predicted recovery time.

Specifically, the management device 20 determines the order of the charge and discharge candidate vehicle group so that the charging and discharging completion time is the shortest when all the charge and discharge candidate vehicles are charged and discharged. In this example, it is assumed that the time required to complete charging and discharging of vehicles B to D is shorter than X1 hours. In this case, vehicle A is added after vehicle D in the charge and discharge candidate vehicle group because charging and discharging of vehicle B to vehicle D is completed before time X1 elapses before vehicle A can be charged and discharged. As a result, the charging and discharging candidate vehicle group is arranged in the order of vehicles C, D, and A.

On the other hand, for example, when the charging and discharging start time of vehicle D is set considerably later, the charging and discharging candidate vehicle group can be set in order of vehicles C, A, and D. For example, even if charging and discharging of three vehicles in the order of vehicles B, C, and A is completed, the case in which the charging and discharging start time of vehicle D is not reached is applied.

In this way, the management device 20 sets the charging and discharging vehicle equipped with the battery 55 that was connected to the EVSE 30 when the error was detected as a vehicle that will be used in the electric power supply-and-demand plan after predicted recovery time at the EVSE 30.

Returning to FIG. 3, the management device 20 transmits the vehicle change information in S18, and ends the processing on the management device 20 side. In the above example, information such as that the charging and discharging vehicle is "Vehicle B", the charging and discharging candidate vehicle group is "Vehicles C, D, and A", and the predicted recovery time of vehicle A is "X1 hours" is transmitted to the EVSE 30.

On the other hand, if the EVSE 30 determines that it has received the vehicle change information (YES in S23), it resumes the process of performing charging and discharging based on the vehicle change information (S24), and ends the process on the EVSE 30 side. In the above example, the EVSE 30 resumes the process of performing charging and discharging that has been interrupted due to the occurrence of an error in vehicle A. In this case, the EVSE 30 sets the vehicle B as a charging and discharging vehicle, and performs charging and discharging with the vehicle B when the vehicle B is connected to the EVSE 30.

As described above, according to this embodiment, the management system 1 includes the EVSE 30, the plurality of batteries 55, and the management device 20. The management device 20 is a device that manages an electric power supply-and-demand plan for a plurality of batteries 55 each electrically connectable to the electric power system PG via the EVSE 30. The management device 20 includes a processor 21 and a memory 22 storing programs executable by the processor 21. When an error that disables charging and discharging is detected, the processor 21 estimates a predicted recovery time until recovery from the error according to the type of the error. The processor 21 sets the charging and discharging vehicle equipped with the battery 55 that was connected to the EVSE 30 when the error was detected as the vehicle that will be used in the electric power supply-and-demand plan after the predicted recovery time at the EVSE 30.

According to this configuration, even if an abnormality that disables charging and discharging is detected, the charging and discharging vehicles on which the battery 55 that was connected to the EVSE 30 at the time of the abnormality detection is mounted is incorporated in the electric power supply-and-demand plan, based on the predicted recovery time until recovery from the abnormality. In this way, since the power supply-and-demand plan is formulated in anticipation of the recovery time from the abnormality, it is possible to suppress a shortage of the power supply and demand amount planned for the electric power system PG. In addition, since the user of the vehicle can supply and demand electric power according to the contract, it is possible to stably adjust supply and demand according to the contract without incurring a penalty.

An error that disables charging and discharging in the EVSE 30 occurred in a charging and discharging vehicle. As a result, since the power supply-and-demand plan is formulated including the charging and discharging vehicle in which an abnormality has occurred, it is possible to suppress the electric power system PG from running short of the planned power supply and demand amount.

When an error is detected, processor 21 selects a vehicle to be connected to EVSE 30 instead of a charging and discharging vehicle from among charging and discharging candidate vehicle groups used for electric power supply-and-demand planning in EVSE 30. The processor 21 adds the charge and discharge vehicle to the charge and discharge candidate vehicle group. In this way, the vehicle to be connected to the EVSE 30 next is selected from the group of candidate charging and discharging vehicles, and the charging and discharging vehicle in which an abnormality has been detected is added to the charging and discharging candidate vehicle group, and the group of candidate charging and discharging vehicle can generated considering that the recovery time from the abnormality.

The order of connection to the EVSE 30 is determined for each vehicle in the charging and discharging candidate vehicle group. The processor 21 determines the order in which the charge and discharge vehicles are connected to the EVSE 30 based on the predicted recovery time when adding the charge and discharge vehicles to the charge and discharge candidate vehicle group. In this way, in the charging and discharging candidate vehicle group, the connection order to the EVSE 30 of the charging and discharging vehicle in which an abnormality has been detected is determined based on the predicted recovery time, sot that charging and discharging to the electric power system PG can be performed such that the wasteful waiting time is not caused as much as possible.

In the present embodiment, the EVSE error is described as an error that occurs in vehicle 50. However, the EVSE error is not limited to this, and the EVSE error may be any error detected in the EVSE 30 during charging and discharging between the electric power system PG and the battery 55, as long as the error disables charging and discharging. For example, the error may be caused by some kind of malfunction that occurs on the EVSE 30 side. If it is estimated that this error will be recovered after X1 hours as the predicted recovery time, the electric power supply-and-demand plan should be adjusted so that the vehicle that was connected to the EVSE 30 when the error occurred will be reconnected after X1 hours.

The embodiments disclosed herein should be considered to be exemplary and not restrictive in all respects. The scope of the present disclosure is indicated by the scope of claims rather than the description of the above-described embodiments, and is intended to include all modifications within the scope and meaning equivalent to the scope of the claims.

What is claimed is:

1. A management device that manages an electric power supply-and-demand plan for a plurality of electric power regulation resources, each of which is electrically connectable to an electric power system via charging and discharging equipment, the management device comprising:

a processor; and a memory storing program instructions that cause the processor to generate the electric power supply-and-demand plan for the plurality of electric power regulation resources provided in a plurality of object vehicles connected to the charging and discharging equipment, the electric power supply-and-demand plan indicating a charging and discharging sequence in which the plurality of object vehicles is to be charged and discharged, receive abnormality information from a first charging and discharging equipment indicating that an abnormality that disables charging and discharging has occurred in a first object vehicle from among the plurality of object vehicles, wherein the first object vehicle is connected to the first charging and discharging equipment; and the abnormality information includes overheat information indicating whether overheating has occurred in an electric power regulation resource from among the plurality of electric power regulation resources, estimate a predicted recovery time until recovery from the abnormality when the overheat information indicates that the electric power regulation resource has overheated, and update the charging and discharging sequence of one or more second object vehicles from among the plurality of object vehicles that were connected to a second charging and discharging equipment when the abnormality was detected, wherein the one or more second object vehicles are charged and discharged in accordance with a reset sequence of the electric power supply-and-demand plan; and an estimated charging and discharging time of the one or more second object vehicles is shorter than the predicted recovery time, and set the charging and discharging of the first object vehicle in the electric power supply-and-demand plan to occur after the predicted recovery time has elapsed at the first charging and discharging equipment in the charging and discharging sequence of the electric power supply-and-demand plan, and transmit the updated charging and discharging sequence of the at least one second object vehicles and the first object vehicle to the charging and discharging equipment to control a sequence in which the at least one second object vehicles and the first object vehicle are charged and discharged.

2. The management device according to claim 1, wherein the abnormality information further includes unrecoverable failure information indicating whether an unrecoverable failure has occurred in the electric power regulation resource that has overheated, and the processor excludes the first object vehicle from inclusion in the electric power supply-and-demand plan when the unrecoverable failure information indicates that the unrecoverable failure of the electric power regulation resource has occurred.

3. A management system, comprising:

charging and discharging equipment;

a plurality of electric power regulation resources provided in a plurality of object vehicles, each electric power regulation resource being electrically connectable to an electric power system via the charging and discharging equipment; and a management device configured to manage an electric power supply-and-demand plan for the plurality of electric power regulation resources, wherein the management device includes a processor configured to generate the electric power supply-and-demand plan for the plurality of electric power regulation resources provided in a plurality of object vehicles connected to the charging and discharging equipment, the electric power supply-and-demand plan indicating a charging and discharging sequence in which the plurality of object vehicles is to be charged and discharged, receive abnormality information from a first charging and discharging equipment indicating that an abnormality that disables charging and discharging has occurred in a first object vehicle from among the plurality of object vehicles, wherein the first object vehicle is connected to the first charging and discharging equipment; and the abnormality information includes overheat information indicating whether overheating has occurred in an electric power regulation resource from among the plurality of electric power regulation resources, determine a type of the abnormality that has occurred in the first object vehicle based on the received abnormality information, estimate a predicted recovery time until recovery from the abnormality when the overheat information indicates that the electric power regulation resource has overheated, and update the charging and discharging sequence of one or more second object vehicles from among the plurality of object vehicle that were connected to a second charging and discharging equipment when the abnormality was detected, wherein the one or more second object vehicles are charged and discharged in accordance with a reset sequence of the electric power supply-and-demand plan; and an estimated charging and discharging time of one or more second object vehicles is shorter than the predicted recovery time, and set the charging and discharging of the first object vehicle in the electric power supply-and-demand plan to occur after the predicted recovery time has elapsed at the first charging and discharging equipment in the charging and discharging sequence of the electric power supply-and-demand plan, and transmit the updated charging and discharging sequence of the at least one second object vehicles and the first object vehicle to the charging and discharging equipment to control a sequence in which the at least one second object vehicles and the first object vehicle are charged and discharged.

* * * * *